United States Patent [19]

Beutler et al.

[11] Patent Number: 5,807,602
[45] Date of Patent: Sep. 15, 1998

[54] METHOD FOR PREPARING A FINELY DIVIDED SOYA BEAN PRODUCT

[75] Inventors: Ernst Beutler, Langnau; Stefan Bodenstab, Konolfingen; Brigitte Gredt-Vogel, Bern; Michel John Arthur Groux, Lauperswil; Martinas Kuslys, Grosshoechstetten; Peter Marwood, Aigle; Michael Schwan, Biglen, all of Switzerland

[73] Assignee: Nestec S.A., Vevey, Switzerland

[21] Appl. No.: 557,071

[22] PCT Filed: Mar. 27, 1995

[86] PCT No.: PCT/CH95/00066

§ 371 Date: Feb. 22, 1996

§ 102(e) Date: Feb. 22, 1996

[87] PCT Pub. No.: WO95/26144

PCT Pub. Date: Oct. 5, 1995

[30] Foreign Application Priority Data

Mar. 28, 1994 [EP] European Pat. Off. .............. 94104840

[51] Int. Cl.$^6$ ....................................................... A23L 1/20
[52] U.S. Cl. ........................... 426/598; 426/518; 426/519; 426/521; 426/634
[58] Field of Search .................... 426/634, 598, 426/518, 519, 521, 11

[56] References Cited

U.S. PATENT DOCUMENTS

| | | | |
|---|---|---|---|
| 3,640,723 | 2/1972 | Uhlig et al. | 99/9 |
| 3,640,725 | 2/1972 | Sherba et al. | 426/46 |
| 3,941,890 | 3/1976 | Drachenberg | 426/46 |
| 3,958,015 | 5/1976 | Gay | 426/18 |
| 4,119,733 | 10/1978 | Hsieh et al. | 426/46 |
| 4,194,018 | 3/1980 | Hodel et al. | 426/580 |
| 4,362,759 | 12/1982 | Harris | 426/632 |
| 4,409,256 | 10/1983 | Johnson et al. | 426/598 |

FOREIGN PATENT DOCUMENTS

| | | |
|---|---|---|
| 0 479 596 | 10/1991 | European Pat. Off. . |
| 2013753 | 4/1970 | France . |
| 2165191 | 12/1971 | France . |
| 7634040 | 11/1976 | France . |

OTHER PUBLICATIONS

Patent Abstracts of Japan, vol. 186, No. 62 (C–1287), 14 Dec. 1994, 06 261706, 20 Sep. 1994.

*Primary Examiner*—Helen Pratt
*Attorney, Agent, or Firm*—Pennie & Edmonds LLP

[57] ABSTRACT

The invention concerns a process for the preparation of a finely divided soya product, wherein:

a) soya beans are dehulled dry, b) the said beans are milled continuously for a short period in the presence of hot water, c) this milled material is heat treated at a temperature above 148° C., the minimum residence time at 148° C. being 30 sec and the minimum residence time at higher temperatures being shorter and d) this suspension is immediately passed through a back-pressure valve.

18 Claims, No Drawings

METHOD FOR PREPARING A FINELY DIVIDED SOYA BEAN PRODUCT

TECHNICAL FIELD

The present invention provides a process for the preparation of a finely divided hydrated soya product incorporating all the components of dehulled soya beans, intended to be used as a nutritional ingredient in food products such as nutritional milk substitute beverages or as a functional ingredient, for example in ice cream.

BACKGROUND ART

U.S. Pat. No. 4,409,256 describes a process for obtaining a soya milk in which whole non-dehulled beans are subjected to dry milling, water is added to form a slurry, this slurry is heat treated with steam to inactivate the anti-trypsin factors, and cooling is carried out with (flash) evaporation of water if the process is put into operation discontinuously, or by means of a heat exchanger if it is put into operation continuously. The suspension is then centrifuged to separate the hulls and the product obtained is dried.

U.S. Pat. No. 4,194,018 describes a process for obtaining an aqueous soya suspension in which dehulled soya beans are subjected to an initial coarse milling in the presence of water, to heat treatment with steam to inactivate the anti-trypsin factors, to cooling with (flash) evaporation and to a second fine milling. A finely divided aqueous soya suspension is then obtained without the necessity for separating a residue incorporating insolubles.

Compared with existing processes for preparing soya milk in which there is always a stage where insolubles are separated, the two aforementioned processes enable all the soya bean to be used, without the non-solubilized residue being rejected, which enables an appreciable nutritional and economic gain to be achieved. However, in the process according to U.S. Pat. No. 4,409,256, the fact of operating with non-dehulled whole beans makes it essential to remove the hulls after heat treatment, which leads to a substantial loss of other components during this operation. Moreover, the process according to U.S. Pat. No. 4,194,018 calls for a second milling with a ball mill after heat treatment, which is very onerous.

As has been seen, obtaining these finely divided soya products of the soya milk type presents a problem that has not yet been resolved by the prior art. It is desirable to be able to use all the soya bean, with the exception of the hull, whilst however attempting to minimize losses of valuable nutritional fractions and reduce production costs, at the same time preserving a perfectly smooth texture and an agreeable non-oxidized taste.

SUMMARY OF THE INVENTION

The object of the present invention is to solve this problem and describes a process for the continuous preparation of a finely divided hydrated soya product incorporating all the components of the dehulled soya bean, wherein:

a) soya beans are dehulled dry, b) the said beans are milled continuously for a short period in the presence of hot water, c) this milled material is heat treated at a temperature above 148° C., the minimum residence time at 148° C. being 30 sec and the minimum residence time at higher temperatures being shorter and d) this suspension is immediately passed through a back-pressure valve.

It is of course understood that according to the invention, heat treatment is carried out at a temperature and for a period that do not have adverse consequences for the organoleptic properties. At 148° C., it is preferable to operate between 30 sec and 3 min.

As regards the upper temperature limit, this is not critical and is only limited by the organoleptic consequences.

It is preferable to operate at a temperature of up to 170° C., in which case the minimum treatment time is about 5 sec.

DETAILED DESCRIPTION OF THE INVENTION

The dry dehulling operation is important and should be carried out with the minimum damage to the two cotyledons, since it is essential for obtaining a smooth suspension that is not rasping to the tongue.

In a second stage, the raw material, comprising dehulled soya beans, is milled in the presence of water. This milling is carried out at a temperature of 60°–100° C., with a soya:water ratio of 1:3 to 1:10, and at a pH of 2.5 to 8.5. Milling is preferably carried out at a temperature greater than 80° C., for example between 85° and 95° C. for a period of the order of 10 sec, preferably 3 to 4 sec. The soya:water ratio is kept within its lower bracket so that a solution is obtained that can be pumped, and within its upper bracket since the solution would be too liquid and would give too low a protein content. The mills used are toothed mills and colloid mills and enable a suspension to be obtained in which 50% of the particles are less than 200 $\mu$m and 90% do not pass 700 $\mu$m. This first coarse milling can possibly be followed by a second finer reduction bringing 90% of the particles down to a size less than 500 $\mu$m. A colloid mill is also used in this case. This operation inactivates the lipoxygenases of the bean through heat from the water, which prevents the development of any characteristic taste resulting from the action of these lipoxygenases on the unsaturated fatty acids contained in the fatty substances in the soya bean.

In a third stage, the suspension is subjected to heat treatment. Heating can be direct or indirect and raises the temperature of the suspension to 150° to 155° C. for a period of about 20–30 seconds. Heating is preferably direct and the temperature of the suspension is raised to 150° C. This stage completely hydrates the suspension and softens the particles. The viscosity of the suspension increases during this stage, which assists the milling which is carried out in the following stage. This stage can for example be carried out in an ultra high temperature (UHT) device conventionally used for milk into which steam is injected at a sufficiently high pressure to enable injection to take place into the suspension, followed by a constant temperature tube. The UHT stage also leads to inactivation of the anti-trypsin factors of the soya.

In a fourth stage, the suspension is immediately passed through a back-pressure valve into a chamber having a reduced pressure relative to the pressure of the suspension on entry. The suspension is subjected to instantaneous (flash) evaporation of steam, which increases the volume of the suspension. On account of the instantaneous evaporation of water absorbed in the steam injection stage, the soya particles undergo disintegration. The fact of increasing the volume of the suspension by passage through the back-pressure valve, suddenly increases friction and so leads to the suspension being milled in the back-pressure valve. Superheated particles can also be disintegrated at the outlet from the back-pressure valve by an explosion caused by rapid expansion of steam. The combination of heating and flash evaporation thus acts as a milling stage. A very fine hydrated suspension is thus obtained in which 50% of the particles have a size less than 60 μm, and 90% less than 90 μm. This disintegration of the particles of the completely hydrated suspension, as well as softening of these particles, enables the said suspension to become smooth (absence of a sandy character in the mouth).

On account of the expansion of steam during passage through the back-pressure valve, the suspension cools to 50° to 120° C., according to the flash evaporation temperature. The suspension can also be cooled to a temperature of between 4 and 60° C.

As the suspension which has undergone heat treatment by steam injection is sterile, it can, after cooling under sterile conditions, be filled aseptically at a temperature of between 4° and 60° C. as it is, that is on its own or in a mixture with for example sterilized cow's milk, without it being necessary to carry out any supplementary operation.

This suspension can be used either in yoghurts, in ice creams or in beverages, in particular those based on milk, the said suspension being added in the desired quantity. For example, for ice creams, an addition is made in order to replace about 25% of skimmed cow's milk. This addition is made for two reasons: either to supply a soya protein content, or for stabilizing the suspension obtained according to the process of the invention. The suspension obtained according to the process of the invention includes the non-solubilized but hydrated and softened residue. If it is desired to obtain powdered soya milk, the presence of the residue has harmful consequences, by reason of the fact that the constituents of the said residue bind water very strongly. This water is conventionally removed in tubular evaporators, and the drying itself is then carried out in a drying tower by spraying. Now the constituents of the residue retain water so strongly that the dry solids content at the outlet from the evaporator can barely exceed 18%, which involves prohibitive drying costs to obtain a powder of this product.

It has been determined that the problem can be resolved if enzyme hydrolysis is carried out on the suspension obtained according to the process described above.

The carbohydrates of the suspension are mainly polysaccharides, of the cellulose, hemicellulose, lignin and pectin types. Enzymes are thus used which degrade these polysaccharides, of the cellulase, hemicellulase, pectinase, amylase, endo-glucanase, pectin-lyase, endo-polygalacturonase, pectin-esterase, endo-arabinase, β-1,4 -galactanase, endoxylanase and arabinofuranosidase type. Moreover, experience shows that proteins also play a part in the phenomena of water retention and high viscosity. A mixture may thus be used comprising enzymes degrading polysaccharides as well as proteases. Enzymes may be made to act in a single stage or successively. The hydrolysis conditions (temperature, pH, hydrolysis time and enzyme concentration) are selected as a function of the enzymes used and of the desired characteristics of the product (more stringent hydrolysis will give a less viscous product). Enzyme hydrolysis is stopped by heat inactivation of the enzymes, by subjecting the suspension to a temperature of 90°–150° C. for 5 sec. to 2 min. It has finally been determined that water may be removed even more easily from the soya suspension by adding an emulsifier either before the milling stage or before or after enzyme hydrolysis. This addition is made at a concentration of between 0.5 and 4% of the said emulsifier with respect to dry matter. This emulsifier is selected from purified monoglycerides, preferably anionic monoglycerides.

The product can be packaged in liquid form either as a fresh product, or in aseptic packaging. It may then be used either alone, or in a mixture with sugar and milk, or in the form of a nutritional beverage containing vitamins, mineral salts and other materials.

The product obtained can also be dried in a conventional device combining an evaporator and spray drying tower. Due to hydrolysis of the constituents responsible for water retention, evaporation may be carried out until dry solids contents of 18–40% are reached, which enables spray drying to be carried out under economically favourable conditions. It may be packaged either alone, or in a mixture with sugar and milk, or to make a nutritional drink.

The product obtained contains all the components of dehulled soya beans. It thus enables dietetic beverages to be prepared (soya milk type) with a high content of hydrolysed fibres, whilst retaining excellent physical and organoleptic properties : ideal viscosity, easy solution of the powder in cold or hot liquids and the absence of a sandy texture in the mouth. A beverage is obtained which has a smooth character in the mouth and is stable on storage. This powder can also be used as an additive to yoghurts and ice creams.

According to the invention, soya pulp obtained from the manufacture of soya milk may also be treated. In this case, this pulp is heat treated at a temperature greater than 148° C., the minimum residence time at 148° C. being 30 sec, the minimum dwell time at higher temperatures being shorter, and this pulp is immediately passed through a back-pressure valve. Heat treatment and the flash evaporation stage is thus the same as for soya bean. What has been said previously for heat treatment also remains valid for soya pulp.

The invention is illustrated in greater detail in the following practical examples.

EXAMPLE 1

Dehulled soya beans were milled in the presence of water previously raised to a temperature of 90° C., in a soya:water ratio of 1:5.7 for 5 sec. This suspension was then passed through a direct steam injection device, where it was instantaneously raised to 150° C. It then passed along a constant temperature tube under a pressure of 5.7 bars for 30 sec. The suspension then passed immediately through a back-pressure valve and entered a chamber under reduced pressure (0.16 bar). This treatment led to a reduction in the size of the particles and to a smooth structure for the suspension. It was cooled instantaneously to 55° C., by flash-evaporation. Samples taken from the outlet of the mill and from the outlet of the vacuum chamber exhibited the following properties:

| Sample | Outlet from mill | Outlet from vacuum chamber |
|---|---|---|
| 50% of particles with a diameter less than | 140 μm | 37.5 μm |
| 90% of particles with a diameter less than | 650 μm | 85 μm |

EXAMPLE 2

The conditions of example 1 were repeated, with the exception of the milling stage, which was carried out twice: an initial coarse milling followed by colloid milling. The following table gives the properties of the suspension obtained.

| Sample | Outlet 1 from mill | Outlet 2 from mill | Outlet from vacuum chamber |
|---|---|---|---|
| 50% of particles with a diameter less than | 165 μm | 165 μm | 40 μm |
| 90% of particles with a diameter less than | 600 μm | 460 μm | 85 μm |

The same conditions were then used as in example 1. The products obtained did not exhibit any differences compared with those in that example.

EXAMPLE 3

The same conditions as in example 1 were repeated, with the exception of the heat treatment which was carried out at 170° C. for 5 sec.

The following table gives the properties of the suspension obtained.

| Sample | Outlet from mill | Outlet from vacuum chamber |
|---|---|---|
| 50% of particles with a diameter less than | 176 μm | 42 μm |
| 90% of particles with a diameter less than | 641 μm | 83 μm |

EXAMPLE 4

Part of the suspension from example 1 was taken as a control sample. The remainder of the suspension was divided into 3 portions A, B and C. Two enzyme mixtures were also prepared:

mixture PROT containing a mixture of proteases mixture POLYS containing a mixture of enzymes degrading polysaccharides. The following table summarizes the enzyme treatments of the different suspension samples.

| Portion | Enzymes | pH | Time (min) | Temperature (°C.) |
|---|---|---|---|---|
| A | PROT | 6.7 | 20 | 55° C. |
| B | PROT + POLYS | 6.8 | 20 | 55° C. |
| C | Two stages: | | | |
| | 1) POLYS | 6.7 | 20 | 55° C. |
| | 2) PROT | 6.7 | 20 | 55° C. |
| Control | | | | |

The quantities of enzymes used were 0.1% for POLYS and 0.05% for PROT (% pure enzyme with respect to the dry matter in the suspension).

Inactivation of the enzymes in each portion was carried out by a 10 sec heat treatment at 110° C.

The following table summarizes the viscosities of the different samples in this stage.

| Portion | Viscosity |
|---|---|
| A | High |
| B | Low |
| C | Low |
| Control | High |

The dry solids content of the different portions was 14% after hydrolysis. Each portion was then transferred to an evaporator. The following table shows the dry solids content obtained at the outlet from the evaporator: Portion Dry solids content at the outlet from the evaporator

| Portion | Dry solids content at the outlet from the evaporator |
|---|---|
| A | 18% |
| B | 26% |
| C | 26% |
| Control | 18% |

Drying was then carried out by spraying the different samples, and the powder obtained was reconstituted in water. The following table summarizes the properties of the beverage obtained:

| Portion | Properties of the reconstituted beverage |
|---|---|
| B and C | excellent texture in the mouth excellent dissolving properties |
| Control | thick sandy texture poor dissolving properties: white spots on the glass wall |

EXAMPLE 5

Soya pulp as obtained in the production of soya milk was taken again. This pulp was rediluted to a dry solids content of 6%. This suspension was then passed through a direct steam injection device, where it was raised to 150° C. It then passed through the constant temperature tube under a pressure of 5.7 bar for 30 sec. The suspension then immediately passed through a back-pressure valve and entered the chamber under reduced pressure (0.16 bar). This treatment led to a reduction in the size of the particles and a smooth structure for the suspension. The suspension cooled to 55° C. by flash evaporation. A product was obtained having the following properties:

| Sample | Pulp after redilution in water | Exit from the vacuum chamber |
|---|---|---|
| 50% of particles with a diameter less than | 153 μm | 40 μm |
| 90% of particles with a diameter less than | 585 μm | 88 μm |

EXAMPLE 6

This example describes the preparation of an ice cream where the milk part was partially replaced by soya. A suspension was prepared as described in example 1. This suspension was then used directly and incorporated in the liquid mixture of the ice cream in the following proportions:

| Ingredient | Recipe without soya (%) dry solids content | Recipe with soya (%) dry solids content |
| --- | --- | --- |
| Skimmed milk powder | 10 | 7 |
| Soya suspension | ./. | 3 |
| Other ingredients (fats, powdered milk whey, sugars, emulsifiers and stabilizers) | 25 | 25 |
| Water | 65 | 65 |
| | 100 | 100 |

This mixture was then deep frozen and an ice cream based on milk and soya was obtained.

Compared with the recipe without soya, ice cream thus prepared showed a richer structure and improved storage stability.

EXAMPLE 7

This example describes the preparation of ice cream where the milk part was partially replaced by soya pulp.

A suspension was prepared as described in example 5. This suspension was then used directly and incorporated into the liquid mixture of the ice cream in the following proportions:

| Ingredient | Recipe without soya (%) dry solids content | Recipe with soya (%) dry solids content |
| --- | --- | --- |
| Skimmed milk powder | 10 | 9 |
| Soya suspension | ./. | 1 |
| Other ingredients (fats, powdered milk whey, sugars, emulsifiers and stabilizers) | 25 | 25 |
| Water | 65 | 65 |
| | 100 | 100 |

This mixture was then deep frozen and an ice cream based on milk and soya was obtained.

Compared with the recipe without soya, ice cream thus prepared showed a richer structure and improved storage stability.

EXAMPLE 8

This example describes the preparation of a nutritional beverage based on whole dehulled soya beans and its aseptic filling.

Dehulled soya beans were milled in the presence of a solution containing all the other ingredients previously raised to a temperature of 90° C., in a soya:water ratio of 1:5.7 for 5 sec. This suspension was then passed through a direct steam injection device, where it was raised to 150° C. It then passed through the constant temperature tube at a pressure of 5.7 bar for 30 sec. The suspension then immediately passed through a back-pressure valve and entered the chamber under reduced pressure (0.16 bar). This treatment led to a reduction in the size of the particles and a smooth structure for the suspension. The suspension was cooled to 55° C. by flash evaporation.

| Ingredient | Recipe % dry solids content |
| --- | --- |
| Soya | 5 |
| Other ingredients (fats, sugars, flavours, emulsifiers and stabilizers) | 10 |
| water | 85 |
| | 100 |

As this beverage was sterile since it had been subjected to heat treatment by steam injection, it was filled aseptically, after cooling under sterile conditions.

EXAMPLE 9

This example describes the preparation of a powdered nutritional beverage based on cow's and soya milk.

A suspension was prepared as in example 1. This suspension was then mixed with all the other ingredients and then dried by atomization. A powdered nutritional beverage was obtained.

| Ingredient | Composition of the powder without soya (%) dry solids content | Composition of the powder with soya (%) dry solids content |
| --- | --- | --- |
| Cow's milk | 60.6 | 33.8 |
| Soya | ./. | 23.0 |
| Other ingredients (sugars flavours, emulsifiers and stabilizers) | 36.4 | 40.2 |
| Water | 3 | 3 |
| | 100 | 100 |

We claim:

1. Process for the preparation of a finely divided soya product, which comprises the steps of:
   (a) dehulling dry soya beans;
   (b) continuously milling the beans in the presence of hot water to produce a milled material of a plurality of particles;
   (c) heat treating the milled material for a residence time of at least 5 seconds to 3 minutes at a temperature of from 148° C. to 170° C. to produce a suspension, wherein the residence time decreases as the temperature increases, with the residence time at 148° C. being at least 30 seconds and the residence time at higher temperatures being shorter;
   (d) directly passing the suspension to a flash evaporation step; and
   (e) flash evaporating water from the suspension to reduce the size of the particles due to explosive pressure from the evaporating water.

2. Process according to claim 1, characterized in that milling takes place with water at a temperature greater than 80° C. and lasts for about 10 sec, preferably about 3–4 sec.

3. Process according to claim 1, wherein the heat treating step is carried out by steam injection at a temperature of between 150° and 155° C. for about 20–30 seconds.

4. Process according to claim 1, wherein the milling step comprises a coarse milling stage and a fine milling stage.

5. Process according to claim 1, wherein the milling step is carried out with a soya:water ratio of 1:3 to 1:10, and at a pH of 2.5–8.5.

6. Process according to claim 1, wherein the suspension is cooled to a temperature of less than 60° C. during the flash evaporation step.

7. Process according to claim 6, characterized in that aseptic filling of the suspension is carried out, either alone, or in a mixture at a temperature of between 4° and 60° C.

8. Process according to claim 1, wherein enzyme hydrolysis is carried out on the suspension following flash evaporation.

9. Process according to claim 8, wherein enzyme hydrolysis is carried out in at least one stage by an enzyme degrading polysaccharides or a mixture of enzymes selected from the group consisting of proteolytic enzymes and of enzymes degrading polysaccharides.

10. Process according to claim 8, wherein a mixture of enzymes is used comprising at least one enzyme degrading polysaccharides and at least one proteolytic enzyme.

11. Process according to claim 10, wherein at least one enzyme degrading polysaccharides is selected from the group consisting of celluloses, hemicelluloses and pectins.

12. Process according to claim 8, wherein the enzyme hydrolysis stage is followed by drying of the hydrolysed suspension.

13. Process according to claim 1, wherein the flash evaporating step is conducted to provide 50% of the particles with a size of less than 60 $\mu$m and 90% of the particles with a size of less than 90 $\mu$m.

14. Process according to claim 1, further comprising adding water to the flash evaporated particles to reconstitute the particles into a soya powder suspension. wherein 50% of the soya powder particles have a size less than 60 $\mu$m and 90% of the soya powder particles have a size less than 90 $\mu$m.

15. Process of preparing a product which comprises preparing the aqueous suspension according to claim 14, and adding this suspension in an amount of up to about 25% by weight of the product to a yogurt ice cream or a beverage to prepare the product.

16. Process for the preparation of a finely divided soya product from a solution of soya pulp particles and water, which process comprises the steps of:

heat treating the solution of soya pulp particles at a temperature of 148° C. to 170° C. for a residence time of at least 5 seconds to 3 minutes wherein the residence time decreases as the temperature increases, with the residence time at 148° C. being at least 30 seconds and the residence time at higher temperatures being shorter;

directly passing the heat treated soya pulp particles to a flash evaporation step; and flash evaporating water from the pulp to reduce the size of the particles due to explosive pressure from the evaporating water.

17. Process according to claim 16, wherein the pulp is heat treated at a temperature of greater than 148° C. to about 170° C. for a time of between about 5 seconds and 3 minutes with shorter times utilized at higher temperatures in the range.

18. Process according to claim 16, wherein the heat treatment of the solution is carried out by steam injection at a temperature of between 150° C. and 155° C. for about 20 to 30 seconds, and the flash evaporating step is conducted to provide 50% of the particles with a size of less than 60 $\mu$m and 90% of the particles with a size of less than 90 $\mu$m, enzyme hydrolysis is carried out on the solution following flash evaporation, the pulp particles are cooled to a temperature of less than 60° C. during the flash evaporation step, and water is then added to the cooled particles to form a suspension.

* * * * *